(12) United States Patent
Bolger et al.

(10) Patent No.: US 9,256,896 B2
(45) Date of Patent: Feb. 9, 2016

(54) VIRTUAL UNIVERSE RENDERING BASED ON PRIORITIZED METADATA TERMS

(75) Inventors: Rosa M. Bolger, Austin, TX (US); Ann M. Corrao, Raleigh, NC (US); Rick A. Hamilton, II, Charlottesville, VA (US); Brian O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 12/548,831

(22) Filed: Aug. 27, 2009

(65) Prior Publication Data

US 2011/0055267 A1 Mar. 3, 2011

(51) Int. Cl.
*G06F 3/048* (2013.01)
*G06Q 30/02* (2012.01)
*A63F 13/30* (2014.01)

(52) U.S. Cl.
CPC ............ *G06Q 30/0283* (2013.01); *A63F 13/12* (2013.01); *A63F 2300/534* (2013.01); *A63F 2300/538* (2013.01); *A63F 2300/5533* (2013.01); *A63F 2300/5546* (2013.01); *A63F 2300/5593* (2013.01); *A63F 2300/6027* (2013.01); *A63F 2300/807* (2013.01)

(58) Field of Classification Search
None
See application file for complete search history.

(56) References Cited

U.S. PATENT DOCUMENTS

| | | | |
|---|---|---|---|
| 6,219,045 B1 | 4/2001 | Leahy et al. | |
| 6,329,986 B1 * | 12/2001 | Cheng | 345/419 |
| 6,490,577 B1 * | 12/2002 | Anwar | G06F 17/3053 |
| 7,797,313 B1 * | 9/2010 | Goyal et al. | 707/723 |
| 8,126,985 B1 * | 2/2012 | Kandekar et al. | 709/217 |
| 2002/0138607 A1 * | 9/2002 | O'Rourke | G06F 17/30592 709/224 |
| 2006/0031578 A1 | 2/2006 | Pelletier | |
| 2007/0128899 A1 * | 6/2007 | Mayer | 439/152 |
| 2007/0266384 A1 * | 11/2007 | Labrou et al. | 718/100 |
| 2007/0277245 A1 * | 11/2007 | Goto et al. | 726/27 |
| 2008/0071742 A1 * | 3/2008 | Yang et al. | 707/3 |
| 2008/0098064 A1 * | 4/2008 | Sherinian | 709/203 |
| 2008/0309671 A1 * | 12/2008 | Shuster et al. | 345/474 |
| 2009/0046094 A1 * | 2/2009 | Hamilton et al. | 345/419 |

(Continued)

OTHER PUBLICATIONS

M. Regan and R. Pose, "Priority rendering with a virtual reality address recalculation pipeline," In Computer Graphics Annual Conference Series (Proceedings of SIGGRAPH 94), pp. 155-162, Orlando, Florida, Jul. 1994.*

(Continued)

*Primary Examiner* — Ulka Chauhan
*Assistant Examiner* — Sultana M Zalalee
(74) *Attorney, Agent, or Firm* — Whitman Curtis Christofferson & Cook, PC; Maeve L. McCarthy (57) ABSTRACT

After a change of location of an avatar in a virtual universe, an avatar is encouraged to remain at that location and avoid an immediate further or return change of location (e.g. by teleportation) by prioritizing rendering of objects such that objects most likely to be of interest to the avatar is performed prior to rendering of objects less likely to be of interest. Prioritization is performed by comparing metadata concerning objective(s) of the avatar and metadata of preferences of the avatar and objects in the avatar's inventory and/or implied from the avatar's activity history with metadata corresponding to objects at the location to which the avatar moves. Preferably, the metadata corresponding to the avatar is ranked in order of the number of occurrences of metadata terms and synonyms in metadata of the avatar.

20 Claims, 5 Drawing Sheets

(56) References Cited

U.S. PATENT DOCUMENTS

| | | | |
|---|---|---|---|
| 2010/0076962 A1* | 3/2010 | Doyle | 707/727 |
| 2010/0156899 A1* | 6/2010 | Bolger et al. | 345/420 |
| 2010/0198869 A1* | 8/2010 | Kalaboukis | G06F 17/30867 707/770 |

OTHER PUBLICATIONS

Choukair, Zièd, Damien Retailleau, and Magnus Hellstrom. "Environment for performing collaborative distributed virtual environments with QoS." Parallel and Distributed Systems, 2000. Proceedings. Seventh International Conference on. IEEE, 2000.*

* cited by examiner

VIRTUAL UNIVERSE RENDERING BASED ON PRIORITIZED METADATA TERMS

FIELD OF THE INVENTION

The present invention generally relates to the production and management of interactive virtual universes presented to users on computers linked by a network and, more particularly, to improvements in rendering of environments and objects following teleportation or other movement of avatars.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated value or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes. Such 3D graphics and virtual landscapes may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof.

In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at will to resemble the real world closely, not at all or with any degree of realism or fantasy in between which may be provided by the administrator of the VU or users of the VU, often for a not insubstantial fee. Further, once such objects or local environments become part of a VU, fees can be charged for use made or them through avatars. On the other hand, many entities have found it advantageous to provide environments closely resembling real world facilities or locales to allow users to experience, though avatars and with a significant degree of realism, particular locales in the real world and a sampling of the likely inhabitants thereof.

Thus, an avatar may freely explore islands and regions within islands of the VU and may find other avatars or objects of interest. However, objects may be very numerous while each requires substantial time to render, particularly after a teleportation to a new destination; requiring the entire image to be re-rendered. At the present state of the art, rendering of objects is ordered, if at all, by proximity to the avatar and the direction the avatar is facing. Therefore, an avatar may move to another new region before objects of interest in a location through which the avatar passes can be rendered.

SUMMARY OF THE INVENTION

It is therefore an object of the present invention to provide a prioritization of rendering of objects in locations within a virtual universe such that objects which are likely to be of interest are rendered earlier than other objects in the proximity of the avatar.

In order to accomplish these and other objects of the invention, a method of operating a virtual universe is provided for performing steps of selecting a group of objects that can be rendered in the vicinity of an avatar, comparing properties and attributes of respective objects of the group of objects with at least one of a request or objective of the avatar and selected metadata corresponding to the object and which best describes the types and subjects of the objects, and prioritizing rendering of at least some objects based on results of the comparing step such that objects having subjects and types which best match the avatars objectives and/or subjects and types of objects in the avatar's inventory must be rendered first.

In accordance with another aspect of the invention, a method of presenting objects of interest to an avatar to avoid immediate further change of location of the avatar is provided for performing steps of selecting a group of objects that can be rendered in the vicinity of an avatar, comparing properties and attributes of respective objects of the group of objects with at least one of a request or objective of the avatar and selected metadata corresponding to the object and which best describes the types and subjects of the objects, and prioritizing rendering of at least some objects based on results of the comparing step such that objects having subjects and types which best match the avatars objectives and/or subjects and types of objects in the avatar's inventory must be rendered first.

In accordance with a further aspect of the invention, a computer program product is provided for performing steps of selecting a group of objects that can be rendered in the vicinity of an avatar, comparing properties and attributes of respective objects of the group of objects with at least one of a request or objective of the avatar and selected metadata corresponding to the object and which best describes the types and subjects of the objects, and prioritizing rendering of at least some objects based on results of the comparing step such that objects having subjects and types which best match the avatars objectives and/or subjects and types of objects in the avatar's inventory must be rendered first.

In accordance with yet another aspect of the invention, a virtual universe system is provided including a comparator for comparing metadata of objects which can be rendered based on proximity to an avatar with an objective of said avatar and metadata corresponding to the avatar, an arrangement for developing an ordered list of the objects that can be rendered based on output of the comparator, an arrangement for retrieving objects in the order in which they appear in said ordered list, and an arrangement for rendering objects in the order retrieved.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
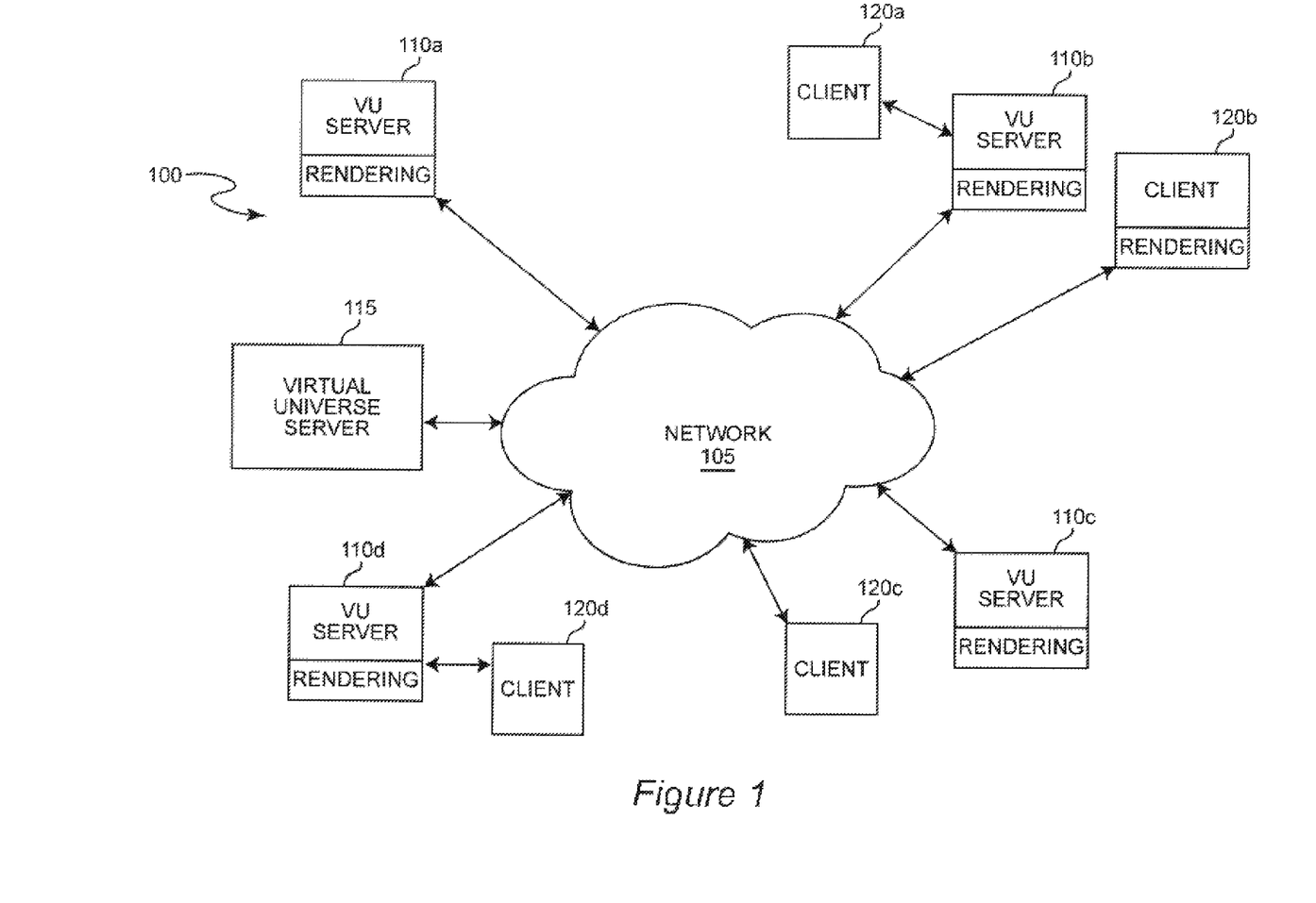
FIG. 1 is a high-level block diagram or data flow diagram of a network-based virtual universe.
Figure 2:
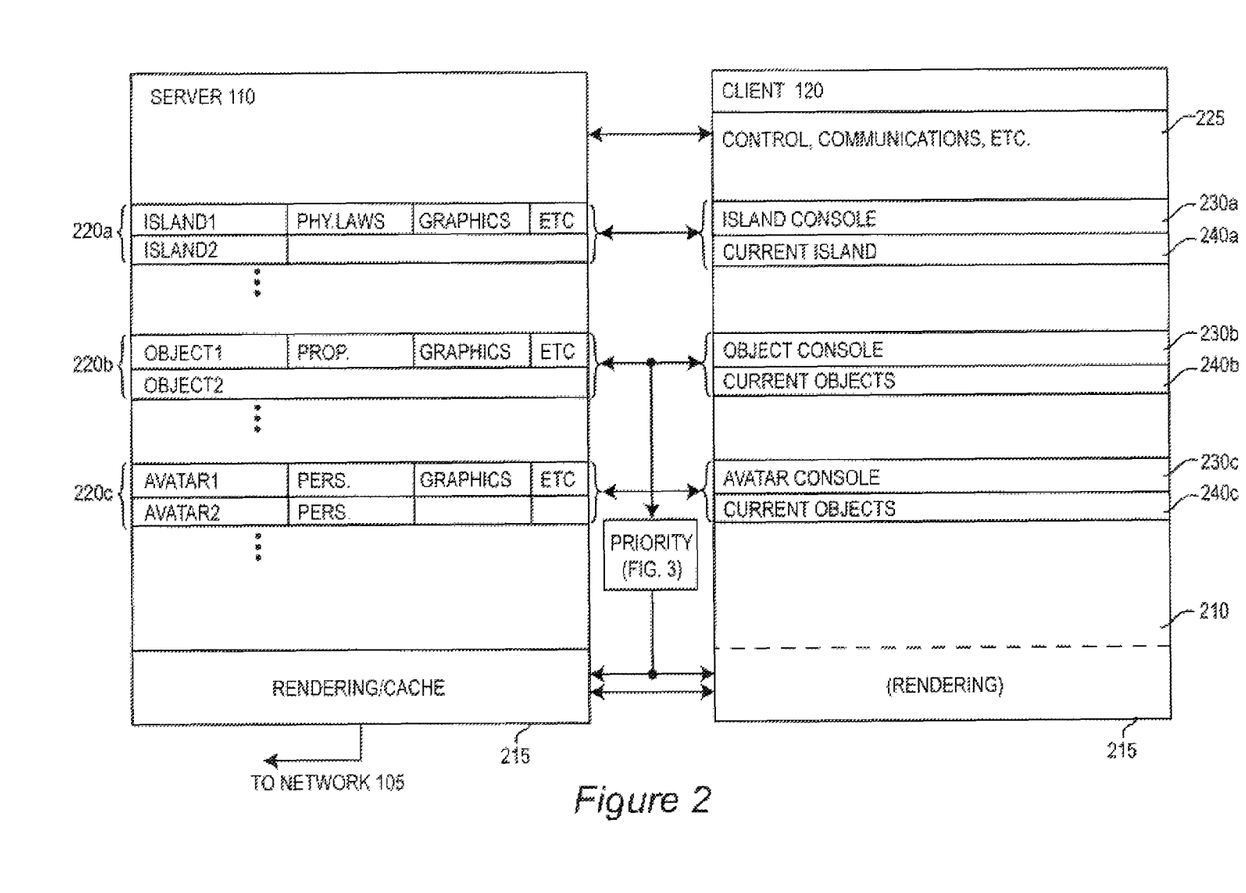
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportation between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 5:
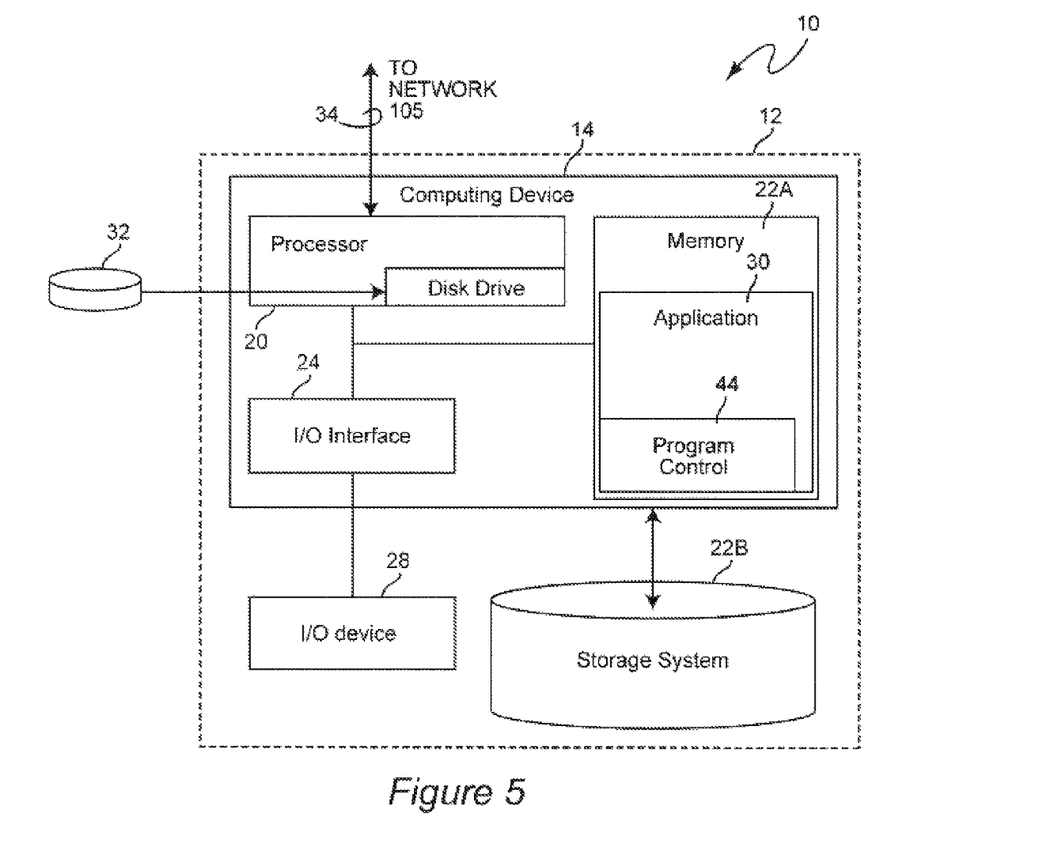
FIG. 5 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 5 and discussed below.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the three-dimensional location of an object in the virtual environment to a location in a two-dimensional display representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden. As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a pre-image) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of the rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for the portion of the rendering performed on a server to be done most expeditiously. For example, when a rendering of a scene is required at, say, client 120a for interaction of a particular avatar with an object while changing location on an island, the rendering (including occlusion or hidden line processing) could be performed at the client, local server 110b or distributed over any or all of servers 110a-110d and possibly even including some client terminals (e.g. 120b) having rendering capability depending on rendering complexity (e.g. required image detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or personality, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor. In order to create islands, objects and avatars, some arrangement for doing so, preferably a graphic user interface (GUI) which may be in the form of one or more screens (possibly nested) functioning as a console 230a-230c may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220a, 220b and 220c for islands, objects and avatars, respectively. Similar GUIs 240a-240c and associated storage are also provided (but preferably resident on the client processor) for control of the current island, object and/or avatar, once it has been created. Suitable arrangements for providing GUIs or consoles 230a-230c and GUIs 240a-240c are known and others providing enhanced user/resident convenience is foreseeable. The current island (220a) with its associated objects (220b) corresponds to the current location of the current avatar (220c) and will be updated as the avatar traverses islands of the virtual universe. The metadata generated and stored in GUIs 240a-240c is the information from which renderings are generated and which govern interactions with avatars through their identities, properties and attributes.

Some definitions which will be helpful in the following discussion are:
1. Avatar—an avatar is a graphical representation the user/resident selects that others can see, often taking the form of a cartoon-like human but which can be produced with any degree of detail, whether realistic or fanciful;
2. Agent—an agent is the user's account, upon which the user/resident can build an avatar and which is tied to an inventory of assets the user creates and/or owns;
3. Region—a region is a virtual area of land (e.g. a portion of an island or an environment associated therewith, such as an interior space in a building) within the virtual universe which typically resides on a single server;
4. Landmarks—a landmark is a map location that can be saved by a user (much in the manner of a "bookmark" in the Internet) and typically comprises a name and a map coordinate within the VU;
5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism to travel rapidly from one VU location to another VU location even if the locations are geographically (e.g. in the context of the topology of a particular VU) far apart such as on different islands or even in different virtual universes. As indicated above, a user can teleport to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer.

In general, an avatar may only interact with other avatars and objects in its vicinity. As a practical matter, as virtual universes grow, the number of avatars and objects as well as features of the environment will increase and limiting the number of objects and features of the environment to those in proximity to a given avatar is not only a reflection of this fact but serves to provides some limit on the number of objects and features which must be managed by the VU system. Perhaps even more importantly from the standpoint of performance of the VU system, it is only the objects in the vicinity of a given avatar or at least visible from the location and orientation of the avatar which must be rendered. Nevertheless, the objects which meet such a criterion may be very numerous.

As alluded to above, each object that exists in a virtual universe has, among an arbitrarily large number of other properties and attributes represented in metadata, a location. Each avatar will also have an orientation, as well, among an arbitrarily large number of other properties and characteristics and preferences, often including an inventory of associated objects, a history of movements, interactions with objects, elapsed time at locations and the like from which interests and preferences can be inferred. Location, generally specified by coordinates with a VU, is among the most important properties represented in the metadata of an object or avatar since it defines the space occupied and is a basic parameter of the rendering process. Since avatars, objects and features of the environment include location information in corresponding metadata and likelihood of interaction of the avatar with an object or feature of the environment should decrease with increasing distance from the avatar, it has generally been the practice to order the rendering of objects, if at all, in order of distance from the avatar with objects closest to the avatar and in the direction the avatar is facing being rendered first. (Also, in general, objects beyond a specified perimeter distance from the avatar, often set at 128 meters or more which the user can increase or decrease, are not rendered at all.) This order of rendering based on proximity can also be determined through a process performed simply, quickly and conveniently by coordinate comparison. It should also be understood that other techniques such as caching and pre-fetching of renderings which may be used to reduce the delay before an image of an object can be presented, are still subject to requiring a finite and possibly significant time to obtain and display. Further, whether an object is rendered or a cached or pre-fetched rendering used for the presentation, the time required to obtain data for display will increase with the image size of the object and the detail therein.

However, as an avatar moves through a portion of a VU by walking or flying or changes orientation, the relative proximity of the avatar to objects existing in the VU and the visibility of such objects will change, causing additional objects to be rendered while rendering of other objects may be terminated or discarded with a frequency which varies with speed of avatar motion. As a limiting case, teleportation to an entirely different environment in the VU or to a different VU requires the entire new environment as well as all objects within the vicinity of the avatar to be rendered. Since rendering is very computationally intensive and objects are and must be independent (e.g. each being specified by a UUID, as noted above), each object must be rendered in sequence and incorporated into a scene representing the avatar's view of the environment. Since a finite and often significant amount of time is required for the rendering of each object, objects will appear in the avatar's view in sequence, as well. Although this effect is not natural relative to a real world experience, it is nevertheless well-accepted and can be masked somewhat by well-understood graphics effects (e.g. reducing contrast to portray more distant objects) that can be generally applied to objects in a scene.

The problem to which the present invention is principally directed arises from the simple fact that an avatar must traverse the geography of a virtual universe, an island and regions within it in order to explore the VU. Often, the avatar will be more interested in or even seeking particular types of objects as regions of the VU are traversed. While the avatar may conduct a search of metadata in the VU system to determine locations which may be of interest or contain objects of interest, there is no assurance that an object of the type sought or in which the avatar may be interested which exists at a given location or vicinity thereof will be satisfactory to the avatar or resident. It is also possible that metadata in regard to a location or region and types of objects located there may be incorrect, sometimes intentionally so to attract avatars to the location or region. Further, since traversing regions of the VU and particularly teleportation requires substantial time, particularly for rendering of the location and objects within the scene presented to a user, the resident corresponding to an avatar may be somewhat impatient and will move on to another location, region or island before a scene is fully rendered if an object of interest is not immediately seen in the image initially presented to the resident. By the same token, depending on the interests of the corresponding resident, the avatar may be moved or may reverse teleport to a previous location before the object that a land-owner (e.g. issuing a teleport invitation) wants avatars to sec can be rendered.

For example, a resident, through an avatar, may be seeking a book store and teleports to a location or region which is indicated (in the metadata corresponding to the region) to include a book store. The region of the VU chosen as the teleport destination includes not only a book store but a shoe store, a department store and a grocery store, as well. Depending on the avatar's location and orientation upon arrival at the teleport destination, the avatar may first see a shoe store because the shoe store, being more proximate to the avatar and/or more directly in the field of view of the avatar may be rendered and presented first or be retrieved as an existing image, film clip or the like as a preview of the destination while rendering is in process. Based on that initial view of the destination, the avatar may determine that metadata may have been incorrect and reverse teleport to an original location before the bookstore is rendered or an image portion indicating its presence otherwise presented. Even if the presentation of the view of the destination is delayed for presentation until the entire scene is fully rendered (which is not particularly desirable to a resident) the resident may have precisely the same reaction upon initially viewing the shoe store without realizing that the avatar must be turned slightly in order to bring the book store into the view of the avatar.

The invention avoids such a problem by performing a comparison of metadata corresponding to properties of objects which can be rendered (e.g. are sufficiently proximate to an avatar location to be rendered at all) with the interests, preferences and objectives of the avatar in order to find one or more matches and develop a priority for object rendering and then rendering the objects in order of descending relevance to the avatar in the field of view of the avatar. By doing so, the rendering will allow an object that is likely to be of interest to be presented in reduced time and premature teleportation to another location or reverse teleporting will be discouraged. Conversely, by use of the invention, an avatar or resident can have increased confidence that if an object of interest does not appear fairly rapidly after a change of location, the metadata concerning items of interest may be false and the avatar need not waste time at the location while the rendering is completed. This effect may also tend to discourage falsification of metadata to attract avatars.

Figure 3:
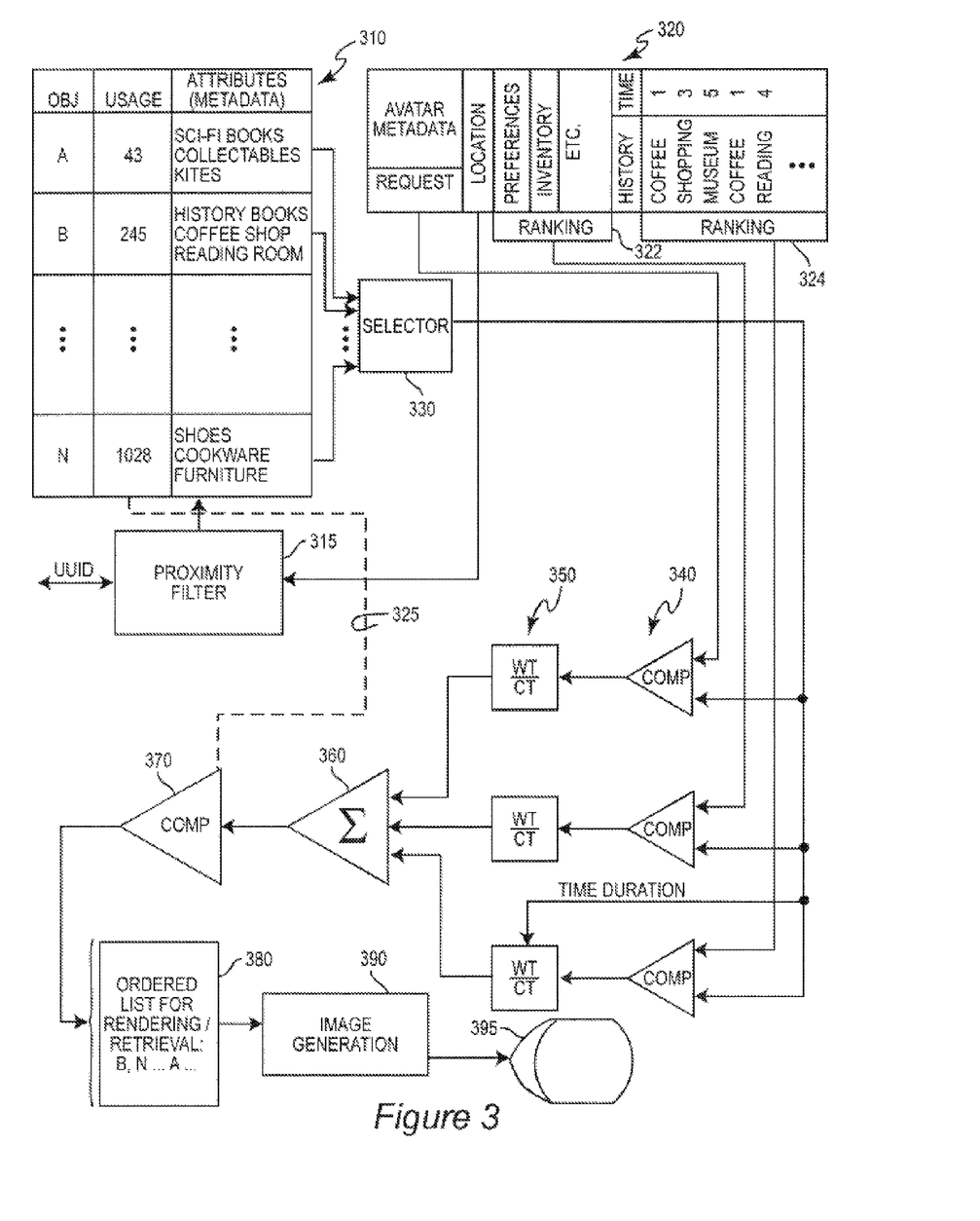
FIG. 3 is a high-level block diagram of a processing architecture suitable for the practice of the invention and which can also be understood as a data flow diagram.

This function may be performed in accordance with a processing architecture such as the exemplary processing architecture illustrated in FIG. 3. It is to be understood, however, that such processing elements as are illustrated in FIG. 3 are preferably developed in software for reasons of interoperability with existing VU infrastructure and ease of modification and/or adjustment for more optimal performance. It should also be understood that substantial portions of the VU infrastructure which are not necessary to the operation of the invention in accordance with its basic principles are omitted from FIG. 3 in the interest of clarity and that the relationship of the architecture of FIG. 3 to such infrastructure is schematically depicted in FIG. 2.

In FIG. 3, table 310 corresponds to selected objects existing in the VU which are within a specified proximity of a particular avatar, as determined by, for example, a coordinate comparison alluded to above which is represented by a proximity filter 315. Table 320 corresponds to a portion or the entirety of the metadata 240c for the current avatar and also includes data corresponding to a current request or objective of the avatar such as (according to the previous example) a search criterion for a book store which may or may not be handled as metadata. The current avatar location is provided to the proximity filter 315 in order to select object metadata included in table 310. Other metadata relevant to the practice of the invention may include, without limitation, expressed preferences and interests of the avatar, an inventory corresponding to the avatar and a history of avatar locations and activities including a time duration for each or at least selected locations and activities (e.g. longer than a threshold time).

In the highly schematic representation of the exemplary architecture of FIG. 3, a separate comparison path is provided for each category of avatar metadata or other criteria to which properties of objects are to be compared. In this case, three paths are illustrated: one for the current objective or request, one for expressed preferences, inventory and the like of the avatar (which is deemed likely to represent types of objects that are of interest to the avatar) and one for avatar history from which additional preferences and interests may be inferred. Each of these paths includes a logical comparator 340 (which may be arranged to apply so-called fuzzy logic) and a register or the like which can, for purposes of this discussion, accumulate a count of avatar metadata items which are matched by properties of an object on an object-by-object basis as controlled by selector 330 and applying a weight thereto. For example, in the case of comparison with avatar activity history, the time duration of an activity or visit at a location which matches a property of an object may form the basis or determination of the weight to be applied and which weight could also be adjusted by how recent the activity or visit may have been. Weights for the request/objective comparison path and the expressed preferences, inventory, etc. comparison path are somewhat more arbitrary, but it is contemplated the a greater weight will be accorded to the current request/objective of the avatar than will be accorded to individual preferences in the request/objective comparison path. In any case, the weights applied are not important to the successful practice of the invention in accordance with its basic principles but can be freely adjusted to adapt performance of the invention for a given resident.

The values derived along each comparison path are then summed or otherwise combined to derive a relevancy value for a current object in regard to the avatar as indicated at 360. These values are then compared at comparator 370 and placed in an ordered list 380 in descending order of magnitude of the relevancy value. The objects in the list can then be read out in order for rendering or retrieval (e.g. of a cached rendering, as alluded to above), the image generated by image generator 390 and the image presented to the resident on display 395. Accordingly, the object most relevant to the avatar will be rendered and a view thereof presented to the avatar first, followed by other objects in decreasing order of relevancy.

In terms of the above example, object A has properties or attributes of a specialty store and if the current request objective of the avatar was a book, there would be a match of only one property/attribute to the request, one match to an expressed preference and one match to an inferred preference (of substantial weight). However in regard to object B, history books might well match the current request/objective as well as expressed preferences of reading and activities of reading and a museum visit while the coffee shop and reading room properties/attributes might be considered to match several expressed and inferred preferences while only the "cookware" property/attribute of object N provides a plausible match. Thus, assuming reasonable values were assigned to the weights corresponding to matches found, the objects would thus be placed in order B, A., . . . N . . . in ordered list 380 and rendered and presented in that order. In the unlikely event that identical scores resulted from this process for two or more objects, the priority among those objects could be set in dependence on the popularity of the object in accordance with accumulated usage as indicated in FIG. 3 by dashed line 325 or any other criterion indicating usefulness to users. However, in practical effect, the sequence of rendering of two objects rated as being of equal interest by the system of the invention (and which the resident may not have consciously compared in regard to relative levels of interest) will be of little importance and may not even be noticeable to a resident if rendering and presentation of objects is reasonably rapid. On the contrary, the meritorious effect of the invention in avoiding undue delay in rendering objects which are likely to be of interest in grounded in developing significant differences in rating scores for different types of objects from which ordered list 380 is developed and which results in objects more likely to be of interest being rendered and presented well in advance of objects which have a lesser likelihood of being of interest.

Thus, a user/resident, knowing the invention to be in use, may be likely to turn the avatar to view the object most likely to be of interest even if it is not in the field of view of the avatar when the rendering of the most relevant object is completed and at least scan the environment for objects of interest before reversing a teleport operation or moving to another location. Similarly, the first object which will appear in the avatar's field of view will be of high relevance to the avatar and its corresponding resident and thus is likely to hold the interest of the avatar or resident and discourage further avatar location change until the rendering is more complete. In either case, the likelihood that an object of the type which is of interest to the avatar will be viewed within a very short time of a location change is greatly increased and erroneous location changes, particularly teleport returns, can be more easily avoided by a user. By the same token, when an invitation is issued for business purposes, advertising or the like, an avatar (or resident) viewing an object of high interest upon change of location is likely to linger at that location, while other objects which may be objects of the invitation are rendered. Additionally, in accordance with the meritorious effects of the invention, the objects which are actually presented to the avatar and resident serve as an indication of the likelihood that an object actually sought is present at the location. That is, if the user first views an object that is considered to be significantly different from an object which is sought while not viewing objects having a reasonable degree of interest for the avatar and the object sought is not visible upon a brief manipulation of the avatar, the user can determine with relatively high confidence that metadata is incorrect and that a suitable object docs not, in fact, exist at the location.

A preferred methodology for developing the functionality of the invention, particularly for performing comparisons discussed above at comparators 340 and 370 and possibly omission or reduction in importance of weighting 350 will now be described in connection with a flow chart illustrated in FIG. 4.

It will be recalled that, for clarity and convenience of illustration in FIG. 3, separate comparison paths were illustrated for the current request, defined avatar preferences, inventory and the like and preferences and interests inferred from avatar activity history with metadata of objects and a separate comparison of weighted comparison scores to develop a ranking.

Figure 4:
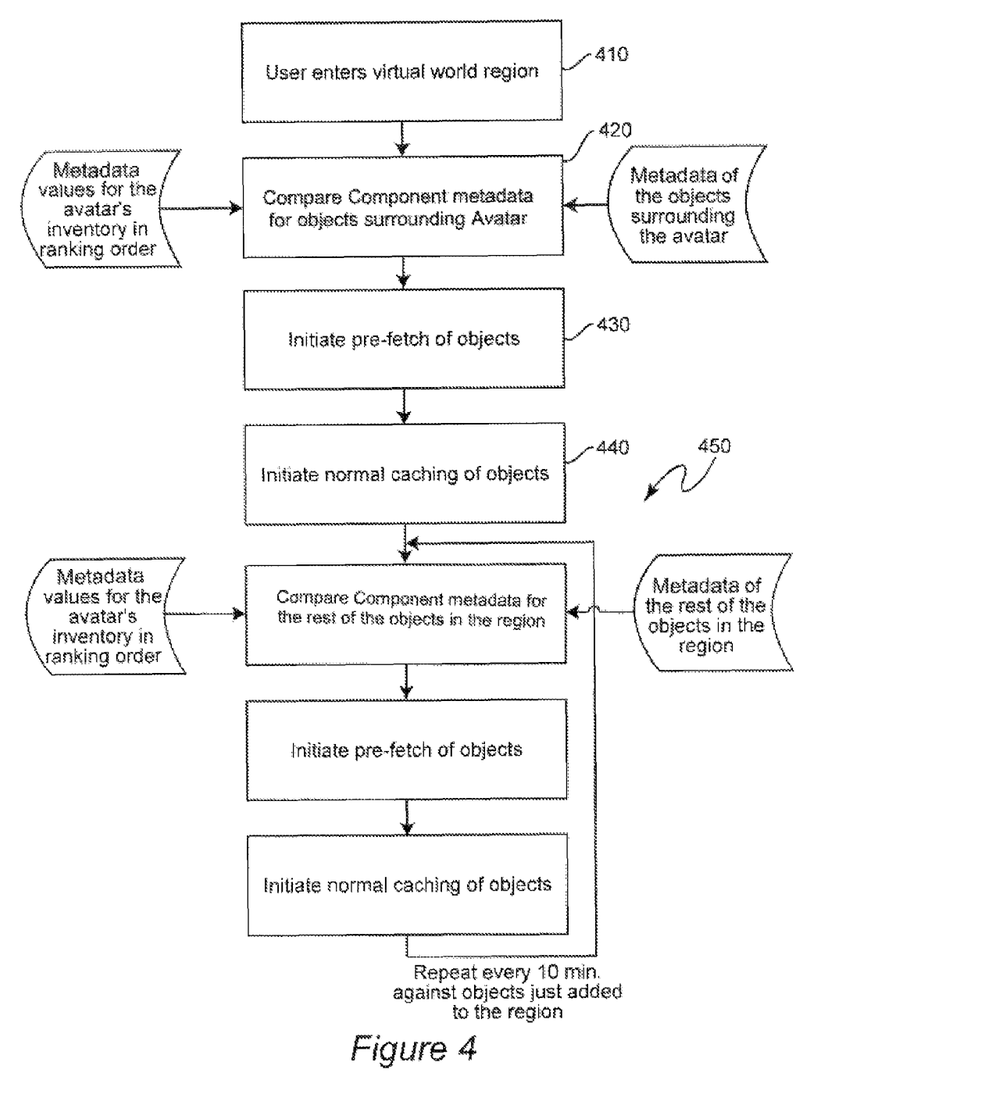
FIG. 4 is a flow chart illustrating a preferred process for comparison of metadata.

The preferred methodology illustrated in FIG. 4 utilizes some pre-processing in the form of ranking of defined and inferred preferences and interests depicted at 322 and 324 of FIG. 3. Such ranking may be performed periodically or as preferences and inventory are defined or inferred from on-going avatar activity and provide an ordering thereof which automatically generates much the same information (at least functionally) as weights and counts applied and developed at 350 of FIG. 3. The provision of such rankings also facilitates early discovery of more important and significant matches to enhance early rendering of objects of interest and thus provides improved performance of the present invention.

Specifically, ranking 322 is preferably performed based on the number of times particular metadata terms (or their practical synonyms) appear in the defined preferences and inventory metadata and ranking of inferred preferences and interests is preferably performed based on some combination of frequency and duration of activities including interactions with objects which have their own metadata; similar terms of which can also be counted. Thus, avatar-related metadata is presented for comparison with metadata of objects in the environment of the avatar in ordered lists of apparent descending order of importance or interest to the avatar. The metadata of objects in the environment of the avatar, once an avatar enters a particular region (410), can then be presented in any order (but may be based on object proximity to the avatar as in known VU systems) for comparison 420 and object image metadata prefetch initiated (430) as matches are found and counted such that scores for indicating relative likely degrees of interest are automatically developed in a descending order. Thus, the objects most likely to be of interest are discovered and a cached (440) for rendering in the normal fashion but in order of descending likelihood of being of interest. This process may then be repeated as indicated at 450 for the remainder of objects in the region where the avatar is located. It is also preferred that process 450 be repeated periodically (e.g. every ten minutes) in a looping fashion to render or delete objects that may be added to or removed from die region surrounding or proximate to the avatar. These remaining of added objects will also be rendered and appear in order of likely interest to the avatar.

It should be noted that while numerous object properties are compared with numerous items of avatar metadata, the processing is straightforward and may be pipelined, such processing is thus very rapidly executed. Further, the number of objects for which comparisons are performed is limited to those selected by proximity filter 315 and possibly placed in an order of descending proximity, as well. It should also be recognized that the above-described processing in accordance with the invention may be limited to objects and, while it may be extended to some features of the environment, for example, by treating those features as objects, the rendering of the remainder of the environment may proceed concurrently and, in any case, would normally be started prior to the rendering or retrieval of objects is started. Therefore, the prioritization of rendering provided by the invention, while somewhat more complex than the prior art, docs not generally increase delays in rendering or image retrieval to any perceptible degree, particularly since objects for which rendering may be relatively delayed will necessarily be of likely lower interest to the avatar. Further, the process can be accelerated by, for example, imposing a threshold on comparison scores (e.g. based on either weights or order of presentation for metadata comparison) such that only those objects with a significant difference in relevance are prioritized in accordance with the principles of the invention while the remainder (which are thus determined to be of significantly lower relevance may be prioritized) for rendering based on proximity to the avatar in the known manner after those objects which are more relevant have already been rendered or retrieved and presented to a user.

In view of the foregoing, it is seen that the invention provides an arrangement and method which operates autonomously and transparently to a user and greatly increases the likelihood that objects of interest will be quickly found as an avatar traverses a VU, particularly following teleportation. In the particular case of teleportation where the entire scene must be rendered, those objects which are most relevant are presented with the fewest other objects and thus the cognitive burden on a user associated with teleportation is also significantly reduced. The invention reduces errors in finding objects of interest and lends to avoid or discourage erroneous or premature reversals of teleportation as well as discouraging deliberate falsification of metadata and, by so doing, provides a significant enhancement to the VU experience as well as VU system function by reducing the processing burden associated with teleportation and corresponding processing for rendering. The function and constitution of the invention is well-suited to being supplied as a service and/or for a fee over the network of data processors on which the virtual universe is implemented.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customers) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A computer-implemented method for operating a virtual universe on a computer system or network, comprising steps of:
   changing a location and orientation of an avatar in said virtual universe by teleportation;
   selecting a group of objects that can be rendered within a perimeter of said avatar;
   comparing properties and attributes of respective objects of said group of objects with selected metadata corresponding to said avatar, wherein said selected metadata with which said comparison is made includes a history of avatar activities and locations visited including time durations previously spent by said avatar doing respective activities or at respective locations visited, and wherein said comparing includes applying different weights to said activities and locations visited based on one or more of a time duration threshold and how recently said avatar performed respective activities or visited respective locations;
   comparing properties and attributes of said respective objects with at least one of a request of said avatar and an objective of said avatar;
   developing an ordered list of said group of objects based on results of said comparing step of said selected metadata corresponding to said avatar and based on results of said comparing step of said at least one of said request of said avatar and said objective of said avatar;
   supplying as a service to a user or resident of said avatar prioritized rendering of at least some objects of said group of objects in the order in which they appear in said ordered list, said supplying being performed in a way which permits said user or resident to know the service to be in use; and
   displaying said at least some prioritized rendered objects of said group of objects in a field of view of said avatar, whereby an additional premature change of said location and orientation of said avatar in said virtual universe by teleportation is avoided and falsification of metadata to attract avatars is discouraged by indicating to the user or resident a likelihood that an object actually sought is present at the location based on what objects are first presented by said steps of supplying and displaying.

2. The computer-implemented method as recited in claim 1, further including
   ranking said selected metadata corresponding to said avatar.

3. The computer-implemented method as recited in claim 2, wherein said ranking step is performed in accordance with the numbers of occurrences of metadata terms in regard to an inventory and preferences of said avatar.

4. The computer-implemented method as recited in claim 2, wherein said ranking step is performed in accordance with the numbers of occurrences of metadata terms implied by prior activities of said avatar.

5. The computer-implemented method as recited in claim 1, wherein metadata of said objects that can be rendered is compared with metadata corresponding to said avatar in order of proximity of respective objects to said location and orientation of said avatar.

6. The computer implemented method of claim 1, further comprising a step of receiving a fee or payment in return for supplying said service of prioritized rendering.

7. A computer program product comprising a non-transitory computer readable medium comprising instructions for a computer, said instructions, when executed by said computer, causing said computer to perform steps of:
   changing a location and orientation of an avatar in a virtual universe by teleportation;
   selecting a group of objects existing in said virtual universe that can be rendered within a perimeter of said avatar;
   comparing properties and attributes of respective objects of said group of objects with selected metadata corresponding to said avatar, wherein said selected metadata with which said comparison is made includes a history of avatar activities and locations visited including time durations previously spent by said avatar doing respective activities or at respective locations visited, and wherein said comparing includes applying different weights to said activities and locations visited based on one or more of a time duration threshold and how recently said avatar performed respective activities or visited respective locations;
   comparing properties and attributes of said respective objects with at least one of a request of said avatar and an objective of said avatar;

developing an ordered list of said group of objects based on results of said comparing step of said selected metadata corresponding to said avatar and based on results of said comparing step of said at least one of said request of said avatar and said objective of said avatar;

supplying as a service to a user or resident of said avatar prioritized rendering of at least some objects of said group of objects in the order in which they appear in said ordered list, said supplying being performed in a way which permits said user or resident to know the service to be in use; and displaying said at least some prioritized rendered objects of said group of objects in a field of view of said avatar, whereby an additional premature change of said location and orientation of said avatar in said virtual universe by teleportation is avoided and falsification of metadata to attract avatars is discouraged by indicating to the user or resident a likelihood that an object actually sought is present at the location based on what objects are first presented by said steps of supplying and displaying.

8. The computer program product as recited in claim 7, wherein said instructions cause said computer to perform a further step of ranking said selected metadata corresponding to said avatar.

9. The computer program product as recited in claim 8, wherein said ranking step is performed in accordance with the numbers of occurrences of metadata terms in regard to an inventory and preferences of said avatar.

10. The computer program product as recited in claim 8, wherein said ranking step is performed in accordance with the numbers of occurrences of metadata terms implied by prior activities of said avatar.

11. The computer program product as recited in claim 7, wherein metadata of said objects that can be rendered is compared with metadata corresponding to said avatar in order of proximity of respective objects to said location and orientation of said avatar.

12. The computer program product of claim 7, wherein said instructions further cause said computer to perform a step of receiving a fee or payment in return for supplying said service of prioritized rendering.

13. A computer or network system for operating a virtual universe, comprising:

means for changing a location and orientation of an avatar in a virtual universe by teleportation;

a comparator configured to compare metadata of objects which can be rendered based on proximity to said avatar with selected metadata corresponding to said avatar, and to compare metadata of said objects with at least one of a request of said avatar and an objective of said avatar, wherein said selected metadata includes a history of avatar activities and locations visited including time durations previously spent by said avatar doing respective activities or at respective locations visited, and wherein said comparing includes applying different weights to said activities and locations visited based on one or more of a time duration threshold and how recently said avatar performed respective activities or visited respective locations;

means for developing an ordered list of said objects that can be rendered based on output of said comparator;

means for retrieving objects in the order in which they appear in said ordered list;

means for supplying as a service to a user or resident of said avatar prioritized rendering of objects in the order retrieved based on said output of said comparator, said supplying being performed in a way which permits said user or resident to know the service to be in use; and means for displaying objects in the order rendered in a field of view of said avatar, whereby an additional premature change of said location and orientation of said avatar in said virtual universe by teleportation is avoided and falsification of metadata to attract avatars is discouraged by indicating to the user or resident a likelihood that an object actually sought is present at the location based on what objects are first presented by said means for supplying and displaying.

14. The computer or network system as recited in claim 13, further including means for ranking preferences and metadata of objects corresponding to said avatar and providing said metadata to said comparator in order of rank.

15. The computer or network system as recited in claim 14, further including means for ranking metadata inferred from a history of activities of said avatar and providing said metadata to said comparator in order of rank.

16. The computer or network system as recited in claim 14, wherein said metadata corresponding to said avatar is ranked by number of occurrences of metadata terms and synonyms thereof to provide an ordered list.

17. The computer or network system as recited in claim 16, wherein said metadata of said objects that can be rendered is applied to said comparator in order of proximity to said location and orientation of said avatar.

18. The computer or network system of claim 13, further comprising means for receiving a fee or payment in return for supplying said service of prioritized rendering.

19. A method of operating a computer or network system for operating a virtual universe on a plurality of networked data processors, said method comprising steps of:

configuring at least one data processor of said plurality of data processors to provide:

means for changing a location and orientation of an avatar in a virtual universe by teleportation;

a comparator configured to compare metadata of objects which can be rendered based on proximity to said avatar with selected metadata corresponding to said avatar, and to compare metadata of said objects with at least one of a request of said avatar and an objective of said avatar, wherein said selected metadata includes a history of avatar activities and locations visited including time durations previously spent by said avatar doing respective activities or at respective locations visited, and wherein said comparing includes applying different weights to said activities and locations visited based on one or more of a time duration threshold and how recently said avatar performed respective activities or visited respective locations;

means for developing an ordered list of said objects that can be rendered based on output of said comparator;

means for retrieving objects in the order in which they appear in said ordered list;

means for supplying as a service to a user or resident of said avatar prioritized rendering of objects in the order retrieved based on said output of said comparator, said supplying being performed in a way which permits said user or resident to know the service to be in use; and means for displaying objects in the order rendered in a field of view of said avatar, whereby an additional premature change of said location and orientation of said avatar in said virtual universe by teleportation is avoided and falsification of metadata to attract avatars is discouraged by indicating to the user or resident a likelihood that an object actually sought is present at the location based on what objects are first presented by said means for supplying and displaying.

20. The method of claim 19, wherein said configuring step further configures at least one data processor of said plurality of data processors to receive a fee or payment in return for supplying said service of prioritized rendering.

\* \* \* \* \*